United States Patent [19]

Vecchio

[11] Patent Number: 4,503,881

[45] Date of Patent: Mar. 12, 1985

[54] AUTOMATIC COUNTERBALANCED SEWER VALVE WITH FLOAT CLOSURE

[76] Inventor: Fiore M. Vecchio, P.O. Box 672, Edmonton, Alberta, Canada

[21] Appl. No.: 566,160

[22] Filed: Dec. 28, 1983

[51] Int. Cl.³ ............... F16K 31/18; F16K 33/00
[52] U.S. Cl. ................... 137/425; 137/448; 137/559
[58] Field of Search ........... 137/424, 425, 428, 429, 137/430, 433, 448, 559

[56] References Cited

U.S. PATENT DOCUMENTS

| | | | |
|---|---|---|---|
| 810,390 | 1/1906 | Bode | 137/448 |
| 818,859 | 4/1906 | Adams | 137/428 |
| 1,205,199 | 11/1916 | Healy | 137/448 |
| 1,541,318 | 6/1925 | Belluche | 137/559 |
| 1,861,397 | 5/1932 | Khun | 137/423 |
| 1,864,443 | 6/1932 | Khun | 137/448 |
| 2,603,493 | 7/1952 | Rusconi | 137/429 |
| 2,928,410 | 3/1960 | Vecchio | 137/448 |
| 4,324,506 | 4/1982 | Steinke | 137/423 |

Primary Examiner—George L. Walton
Attorney, Agent, or Firm—Sim & McBurney

[57] ABSTRACT

An automatic valve for a sewer or the like includes a body having an upstream inlet and a downstream exit for liquid. A path joins the inlet and exit, and a closure gate is hingedly mounted to the body at a substantially horizontal axis located above the path, so that the gate can swing between a first position in which it blocks the path and a second position in which it unblocks the path. An arm is fixed with respect to the closure gate to swing with it in such a way that the arm is higher when the gate blocks the path than it is when the gate unblocks the path, the arm counterbalancing the closure gate so that the latter normally seeks the second position. A cage surrounds the arm and communicates with the path, and a float member in the cage under the arm means is free of connection to the arm means or any other part of the apparatus, whereby a rise in liquid level causes the float member to urge upwardly against the arm and close the closure gate.

10 Claims, 3 Drawing Figures

AUTOMATIC COUNTERBALANCED SEWER VALVE WITH FLOAT CLOSURE

This invention relates generally to sewage valves intended to prevent reverse flow of liquid along a sewage pipe.

BACKGROUND OF THIS INVENTION

The prior art contains certain devices adapted to act as one-way valves (check valves) permitting liquid to flow in one direction only along a pipe or conduit. More specifically, the following two patents are considered relevant to the present invention:
U.S. Pat. No. 4,324,506, issued Apr. 13, 1982 to Steinke.
U.S. Pat. No. 1,861,397, issued May 31, 1932 to Khun.

Both of these prior patents incorporate a structure in which a closure gate is adapted to be swung to the closed position by the action of the rising level of liquid on one or more floats. The floats are connected to one end of a simple lever arrangement, the other end of which is the closure gate.

The more relevant of these two prior patents is Khun, who shows a check valve for sewage pipe in which relatively large float members are pivotally connected through a crankshaft arrangement to a closure gate. The weight of the floats maintains the closure gate in the open position when the water level in the valve is low, and the upward buoyant effect of rising water on the floats allows the closure gate to close by swinging downwardly under its own weight.

Both of these prior patents, however, suffer from certain disadvantages which it is an aspect of the present invention to overcome. In the first place, the provision of pivoted or hinged connections between various components always represents a danger, in that rust or extraneous materials could become lodged in and around the pivot region, thus inhibiting the action of the gate, possibly with disastrous effects.

In this connection, it is important to understand that most municipal and government regulations pertaining to sewage and plumbing do not permit any valve of this kind to stay closed on a permanent basis, due to the fact that, without circulation of air, there is a danger of gas accumulation which could lead to explosion. It is thus important for the valve to be naturally biased to the open position, except when it is activated to close upon build-up of the liquid level due to reverse flow. Thus, a problem with the prior art devices described above is that the hinged or pivotal connection between the floats and the closure gate could become clogged or coated in such a way as to prevent the proper functioning of the valve.

Yet another danger exists with the prior art devices, namely that, in the event that the floats become disconnected from the closure gate arrangement, the latter would naturally seek a closed position under the action of gravity. This would take place even at low liquid levels, which would lead to the danger of gas build-up and explosion.

Yet another disadvantage of the prior art arrangements is the fact that, being of very large size, it is necessary to go to some trouble in order to gain access to the interior for inspection.

GENERAL DESCRIPTION OF THIS INVENTION

In view of the foregoing disadvantages of the prior art systems, it is an object of one aspect of this invention to provide an automatic check valve for a sewer which minimizes the hinged or pivotal connections by providing a float member or members which are not connected in any way to any other part of the apparatus.

It is an object of another aspect of this invention to provide a sewage check valve arrangement in which the closure gate always seeks an open position due to the influence of gravity, rather than a closed position, this tendency being overcome only when the water level rises and brings the free float or floats into contact with an arm extending from the closure gate.

It is a further object of an aspect of this invention to provide a compact automatic sewage valve with a cover plate of which at least a portion is transparent, thus allowing ready inspection of the interior thereof without disassembly.

It will be appreciated from the description which follows that the provision of a free float permits the use of a float design that is far less likely to develop leakage than is the case with the prior art. Whenever the float must be mechanically attached to another portion of the apparatus, and particularly whenever the float is made of metal (constructed as a hollow body), there is always the danger of corrosion due to acidic materials, rusting, and simply mechanical failure.

Accordingly, it is an object of a further aspect of this invention to provide a sewage check valve in which the float or floats are constituted by sealed, elastomeric, hollow bodies, thus providing increased reliability.

More particularly, this invention provides an automatic valve for a sewer or the like, which includes a body defining an upstream inlet and a downstream exit for liquid, and a path joining the inlet and exit. A closure gate is hingedly mounted to the body at a substantially horizontal axis located above the path, such that the gate can swing between a first position in which it blocks the path and a second position in which it unblocks the path. Arm means are fixed with respect to the closure gate to swing therewith, in such a way that the arm means is higher when the gate blocks the path than it is when the gate unblocks the path, the arm means counterbalancing the closure gate so that the latter normally seeks the second position. A cage surrounds the arm means and communicates with the path, and a float member in the cage is located under the arm means, the float member being free of connection to the arm means, the body and the cage.

GENERAL DESCRIPTION OF THE DRAWINGS

One embodiment of this invention is illustrated in the accompanying drawings, in which like numerals denote like parts throughout the several views, and in which:

FIG. 3 is a partial sectional view taken at the line 3—3 in FIG. 1.

DETAILED DESCRIPTION OF THE DRAWINGS

Figure 1:
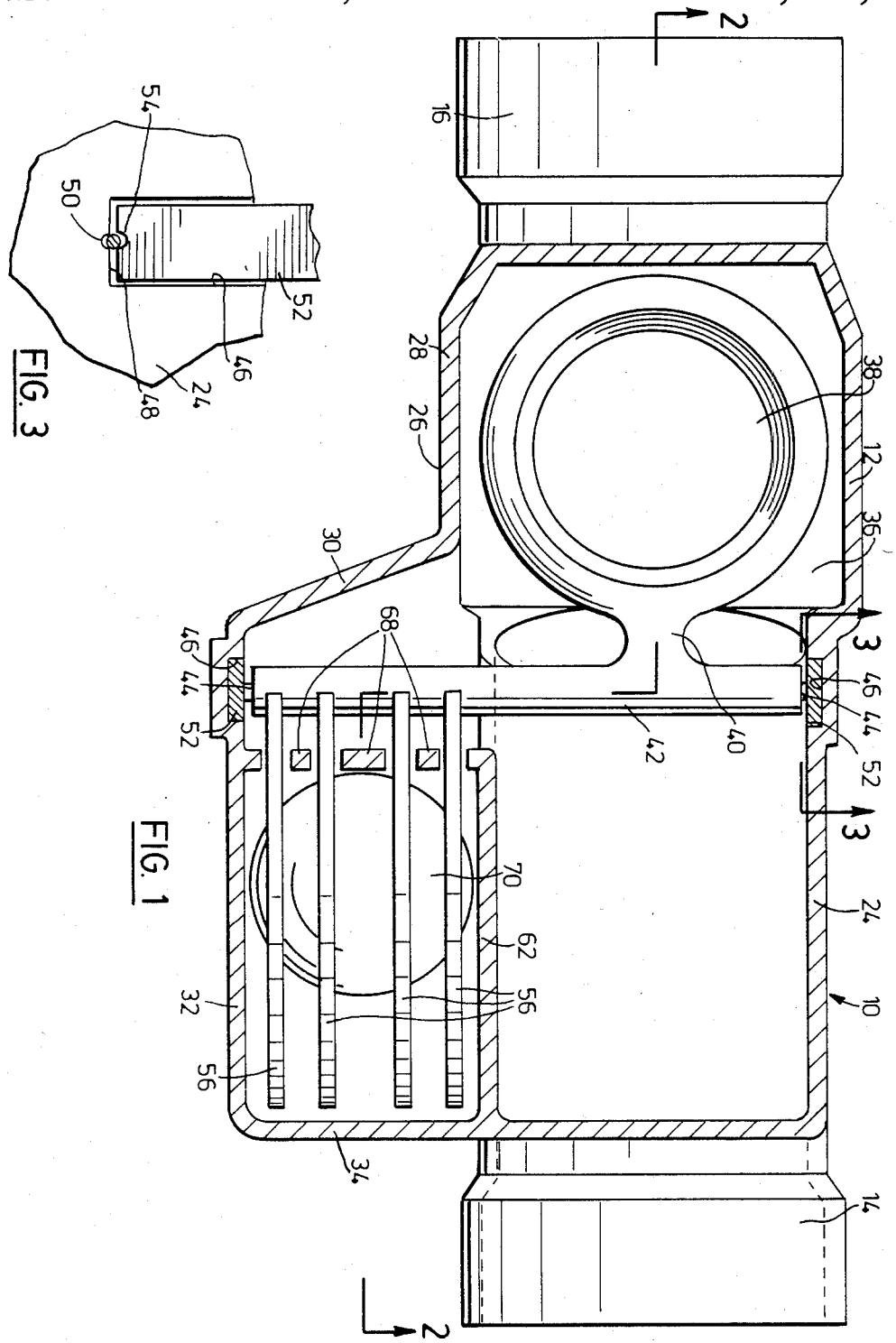
FIG. 1 is a sectional view taken through an automatic sewage valve constructed in accordance with this invention, the section of FIG. 1 being shown at 1—1 in FIG. 2.
Figure 2:
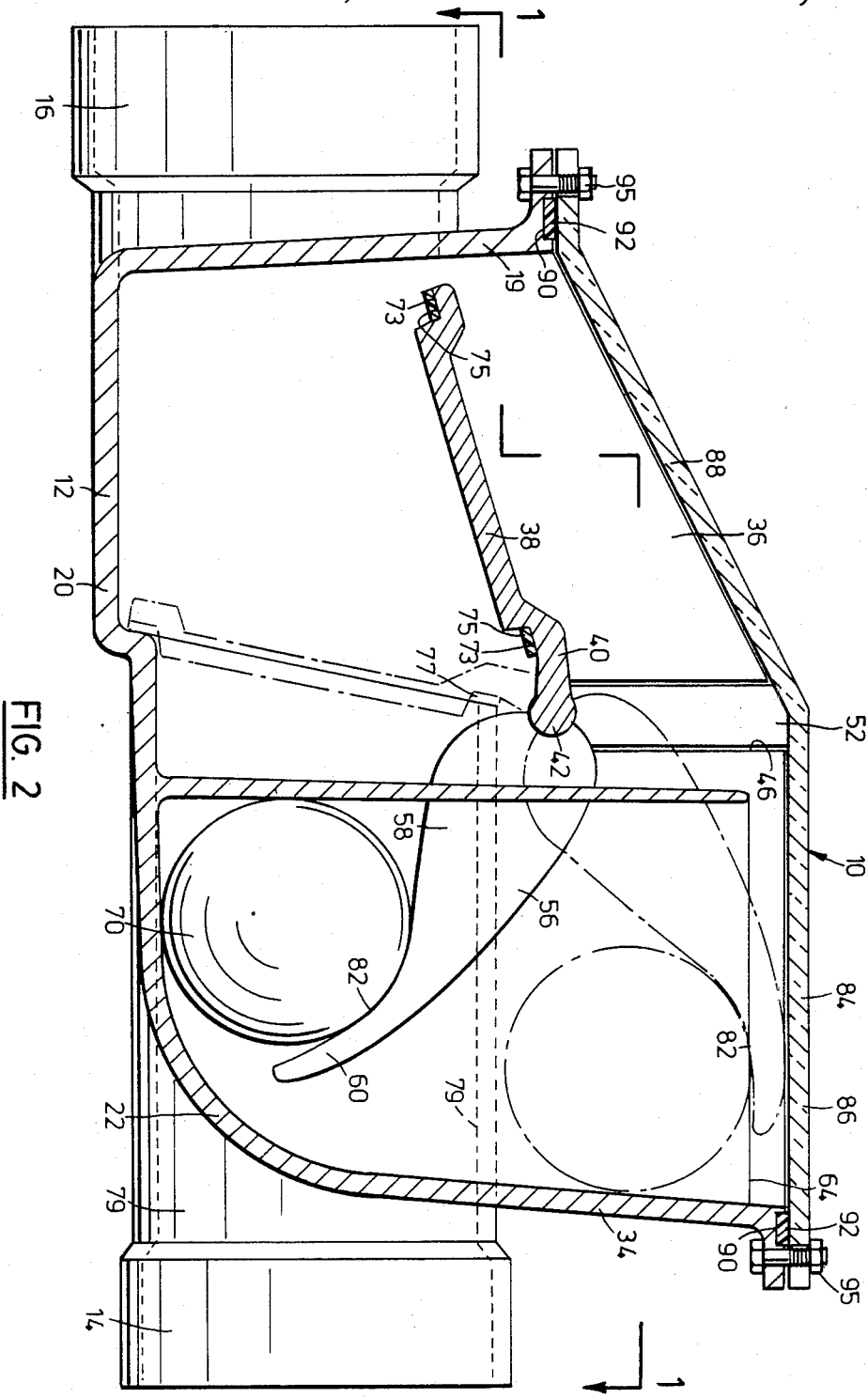
FIG. 2 is a vertical sectional view taken at the line 2—2 in FIG. 1.

Attention is directed to FIGS. 1 and 2, in which a sewage check valve is generally shown at 10. The check valve 10 includes a body 12 having an upstream inlet 14 of cylindrical configuration, and a downstream outlet 16 also of cylindrical configuration. The inlet and outlet 14 and 16 are shaped to telescopingly receive the ends of lengths of sewage pipe between which the check valve 10 is to be connected.

As seen, the body 12 includes a downstream wall 19, a bottom wall 20, and a curved upstream wall 22. The body 12 further includes a first side wall 24, and a second side wall 26, the latter having a first portion 28 generally parallel to the first side wall 24, a second portion 30 oblique to the first side wall 24 and constituting a widening step in the second side wall 26, a third portion 32 generally parallel with the first side wall 24, and a fourth portion 34 generally perpendicular to the first side wall 24. The first portion 28 of the second side wall 26 defines with the downstream portion of the first side wall 24 a valve chamber 36 in which is contained a closure gate 38.

The closure gate 38 is circular in plan, as can be seen in FIG. 1, and is integrally connected with a neck portion 40 which in turn is integrally connected with a pivot shaft 42.

The pivot shaft 42 has reduced, coaxial, pin portions 44 at either end, which are adapted to be journalled in a recess defined by the body 12 and two sliding inserts. More particularly, with reference to FIG. 3, a portion of the first side wall 24 is illustrated, the same having a vertically elongated recess 46, which can also be seen in FIG. 1. At the bottom of the recess 46 is a lower wall thereof 48, having a semi-circular pocket 50. Slidably received within the recess 46 is a bar member 52 which likewise has a semi-circular pocket 54 in its bottom end. The two pockets 50 and 54 cooperate to define the bearing for the respective pin 44. The same arrangement is provided at the other end of the pivot shaft 42, as can be seen with reference to FIG. 1.

Secured to the pivot shaft 42, as by welding or the like, are a plurality of spaced-apart similar fingers 56, which are somewhat drop-shaped, as can be seen in FIG. 2. More particularly, the fingers 56 have a thickened portion 58 adjacent the pivot shaft 42, and have a tapering and downwardly curving tail portion 60 remote from the pivot shaft 42.

As can be seen in FIG. 1, the body 12 includes an internal solid partition 62 which extends from the bottom wall 20 upwardly adjacent the upstream wall 22, and terminates at a free edge 64 spaced below the top of the body 12. The partition 62 is generally parallel to the first side wall 24, and lies to one side of the general path of liquid flow between the upstream inlet 14 and the downstream outlet 16. Extending between the downstream edge of the partition 62 and the third portion 32 of the second side wall 26 are a plurality of upright, spaced-apart ribs 68, arranged in such a way that the spaced-apart similar fingers 56 are interleaved with the ribs 68 without contacting the same.

Thus, the partition 62, the ribs 68, and the upstream wall 22 including the fourth portion 34 constitute a cage with a tapering rounded portion in the bottom as can be seen in FIG. 2.

Into this cage, below the fingers 56, is placed a float member 70, this being preferably a hollow, resilient, elastomeric ball similar to a tennis ball.

It can now be seen by inspection of FIG. 2 that the cage just defined is shaped to maintain the spherical float member 70 at all times under the arm means constituted by plurality of fingers 56. More particularly, the upstream wall 22 of the cage is rounded in such a way as to follow closely the locus travelled by the remote end of the tail portion 60 of the fingers 56 constituting the arm means connected to the pivot shaft 42.

Turning now to the closure gate 38, it can be seen in FIG. 2 that this portion has an annular recess 73 in which is located an annular seal 75, the latter being adapted to seal against a mouth 77 at the oblique end of a pipe 79 which is simply an extension of the cylindrical upstream inlet 14. Thus, when the closure gate 38 is in the position shown in broken lines in FIG. 2, it closes the pipe 79 and thus prevents any liquid access from the valve chamber 36 to the pipe 79.

It is important to note that the fingers 56 constituting the arm means which rest above the float member 70 are heavy enough to counterbalance the closure gate 38 into the open position shown in solid lines in FIG. 2, whenever the liquid level in the valve chamber 36 and the cage defined by the partition 62 and the ribs 68 is low, and the float member 70 is not exerting an upward force on the fingers 56. This fact, plus the fact that the float member 70 is free of any connection to any other part of the apparatus, guarantees that the closure gate 38 will never become stuck in the closed position with the attendant risk of gas build-up and explosion. This fail-safe characteristic is further enhanced by the fact that the number of hinge connections has been reduced to an absolute minimum, namely the hinging of the pivot shaft 42 with respect to the body. There is no hinging or pivotal connection between the float member 70 and the fingers 56, and therefore no fear that such connection will become clogged, corroded, rusted or stuck in some other way, thus hampering the proper functioning of the apparatus.

It will be appreciated that, due to the fact that the float member 70 is in fact free of connection with the rest of the apparatus, the fingers 56 must be heavy enough to counterbalance the closure gate to the open position, otherwise the closure gate would always seek the closed position, which would lead to the danger of gas build-up and explosion.

It is further pointed out that the upstream wall 22, as seen in FIG. 2, is advantageously shaped to follow the path of the end of the fingers 56 remote from the pivot shaft 42, in order to ensure that the float member 70 always remains beneath the fingers. This arrangement produces a further advantage, namely that, when sewage back-up occurs and the float begins to rise upon a rise in liquid level, the float member 70 moves outwardly and upwardly with respect to the pivot shaft 42, thus providing a greater closure moment on the gate 38 when the latter is in its closed position shown in broken lines in FIG. 2, than when it is in the open position. This is of advantage in ensuring a secure closure. To aid this movement of the float 70 outwardly as the closure gate 38 closes, the fingers 56 are shaped to define a downwardly convex curvature 82 under the portion remote from the pivot shaft 42. By the time the fingers 56 reach a horizontal position, in which the closure gate 38 is half closed (i.e. half way between the open position shown in solid lines and the closed position shown in broken lines in FIG. 2), there is a tendency for the float member to move outwardly away from the pivot shaft 42 in order to reach the highest possible position under the floatation forces exerted by the liquid.

Turning again to FIG. 2, the body 12 is closed by a transparent cover 84 having a horizontal portion 86 and an oblique portion 88. At the top of the rim surrounding the body 12, there is a recess 90 in which is located a gasket 92, adapted to seal against the transparent cover 84. Suitable closure bolts 95 are provided at intervals around the transparent cover 84, to urge the same tightly against the gasket 92 in order to close the top of the body 12. It will be appreciated that the provision of the transparent cover 84 allows immediate inspection of the interior of the valve without the necessity of disassembly.

It will further be appreciated that the automatic valve disclosed herein could be altered to provide two floats, one on either side of the main passage, if desired.

There has been disclosed herein a sewage check valve having considerable simplicity of design and security of operation, along with low maintenance and ease of manufacture.

Preferably the body 12 is manufactured of plastic, although of course other materials could also be utilized.

While one embodiment of this invention has been illustrated in the accompanying drawings, and described hereinabove, it will evident to those skilled in the art that changes and modifications may be made therein without departing from the essence of this invention, as set forth in the appended claims.

The embodiments of the invention in which an exclusive property or privilege is claimed are defined as follows:

1. An automatic valve for a sewer or the like, comprising:
    a body defining an upstream inlet and a downstream exit for liquid, and a path joining the inlet and exit,
    a closure gate hingedly mounted to said body at a substantially horizontal axis located above said path, such that the gate can swing between a first position in which it blocks said path and a second position in which it unblocks said path;
    arm means fixed with respect to the closure gate to swing therewith, in such a way that the arm means is higher when the gate blocks said path than it is when the gate unblocks said path, the arm means counterbalancing the closure gate so that the latter normally seeks said second position,
    a cage surrounding the arm means and communicating with said path, and
    a float member in said cage under the arm means, the float member being free of connection to the arm means, the body and the cage, the float following the arm means while guided by the cage during closure of the gate, and moving along the arm to the extent permitted by the cage in order to positively shut the closure gate.

2. The invention claimed in claim 1, in which the cage is shaped to maintain the float member at all times under the arm means.

3. The invention claimed in claim 2, in which the float member is spherical, and the cage is rounded to follow closely the locus travelled by the part of the arm means which is the furthest remote from the said axis.

4. The invention claimed in claim 3, in which the body defines a mouth intermediate the inlet and the outlet, the closure gate closing against said mouth when in said first position, the closure gate extending generally downwardly when in said first position, the arm means forming an obtuse angle with said closure gate, the arm means extending obliquely upwardly from said axis when the closure gate is in the first position and extending obliquely downwardly from said axis when the closure gate is in the second position.

5. The invention claimed in claim 4, in which the float member is a hollow, resilient, elastomeric ball.

6. The invention claimed in claim 5, in which the body includes a transparent cover plate, to allow inspection of its interior while in operation.

7. The invention claimed in claim 4, in which the cage is defined in part by a plurality of upright, spaced-apart ribs, and the arm means is constituted by a plurality of spaced-apart similar fingers which are interleaved with the ribs.

8. The invention claimed in claim 7, in which the undersurface of the fingers is convex.

9. The invention claimed in claim 1, in which a portion of said body is transparent, to allow inspection of its interior.

10. The invention claimed in claim 1, in which the arm means and cage are displaced laterally to one side of the said path.

* * * * *